Feb. 7, 1928.
A. TAUB
1,658,772
MEANS FOR DAMPING TORSIONAL VIBRATIONS
Filed Jan. 5, 1923
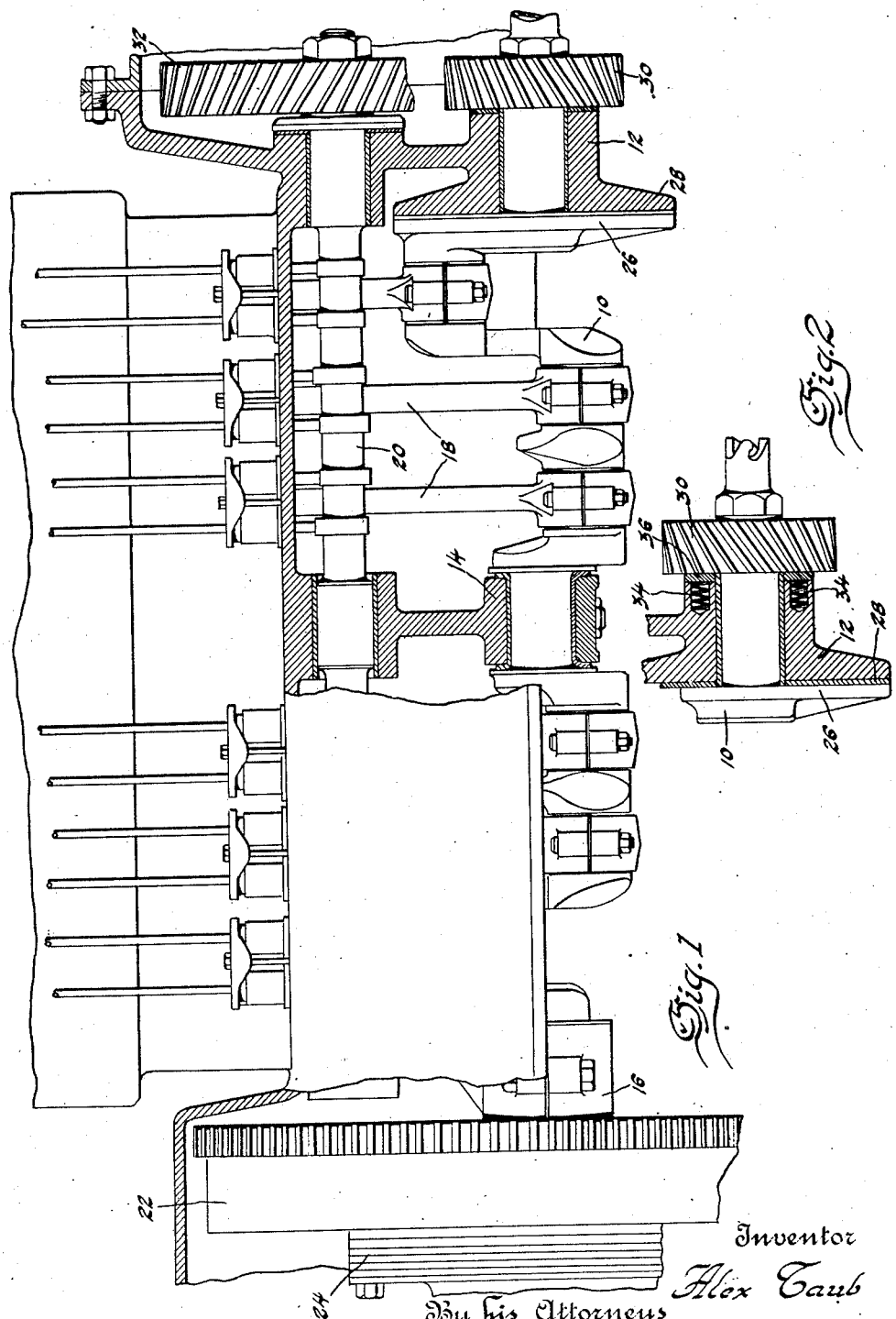
Inventor
Alex Taub
By his Attorneys
Blackwood, Spencer + Flint.

Patented Feb. 7, 1928.

1,658,772

UNITED STATES PATENT OFFICE.

ALEX TAUB, OF DETROIT, MICHIGAN.

MEANS FOR DAMPING TORSIONAL VIBRATIONS.

Application filed January 5, 1923. Serial No. 610,788.

This invention relates to devices for damping or absorbing torsional vibrations in crank shafts, etc., and is illustrated as embodied in the power plant of an automobile.

In converting intermittent impulses to rotary motion, the application of power in separate impulses produces torsional vibrations in the crank shaft, and it is desirable to reduce or eliminate these vibrations as far as possible by damping or absorbing them. Vibration damping devices of the general type of the device shown in Patent No. 1,085,443, granted Jan. 27, 1914 on application of Frederick William Lanchester, have heretofore been used for this purpose; these devices depending on the inertia of a small flywheel frictionally connected to the crank shaft. While they have been generally satisfactory, these devices are rather expensive, and they sometimes have a tendency to bind or stick in such a manner as to eliminate the frictional action.

An object of the present invention is to provide an efficient and relatively inexpensive device of this character which cannot bind or otherwise become inoperative. This is accomplished by providing, in combination with the crank shaft, means continuously resisting its rotation absorbing or damping out the greater part of the vibration.

To provide an inexpensive device operating in this manner, I find it advantageous to utilize end thrust in the crank shaft to press together two friction members which are in constant engagement with one another. In the embodiment of the invention illustrated in the drawings, these members take the form of friction disks, carried respectively by the crank shaft and by one of its bearings. In the illustrated type of engine, I prefer to provide an end thrust by connecting the crank and cam shafts with timing gears having spiral teeth, the inertia of the cams and other parts serving to press outwardly through the spiral teeth more at high than at low speeds. In engines designed to operate at lower speeds, springs may be provided to bring the end thrust up to an amount sufficient to operate the vibration damping device efficiently.

Other objects and features of the invention, including various particular constructions and novel combinations, will be apparent from the the following description of embodiments of the invention illustrated in the acompanying drawings, in which:

Fig. 1 is a view, partly in section and partly in side elevation, showing the crank shaft and associated parts; and Fig. 2 is a detail view corresponding to part of Fig. 1 showing springs used to increase the end thrust of the crank shaft.

In these drawings, the crank shaft is indicated at 10, and is shown as supported by end and center bearings 12, 14 and 16. The crankshaft is rotated in the usual manner through connecting rods 18 operated by the pistons of the engine. A cam shaft 20, carrying a series of valve-operating cams, is mounted above and parallel to the axis of rotation of the crank-shaft. A flywheel 22 and clutch 24, of well known types, are shown at one end of the crankshaft. These parts may be and are shown as being, of usual construction.

As above explained, in order to take advantage of end thrust in the crankshaft to damp out torsional vibrations, a pair of friction disks 26 and 28 are arranged in engagement with one another, disk 26 being carried by or integral with the crankshaft, and disk 28 being carried by or integral with bearing 12. These disks are fairly large, six inches in diameter being a suitable size, and may be faced with friction material.

The cam and crankshafts may be connected by timing gears 30 and 32 having helical or spiral teeth inclined in such a direction as to thrust crankshaft 10 toward the right (Fig. 1).

With engines operating at lower speeds the end thrust may be increased by springs 34 (Fig. 2) engaging bearing 12 and a Babbitt washer 36 bearing against gear 30.

In operation, as the speed of rotation of crankshaft 10 is temporarily increased by a power impulse received from one of the connecting rods 18, the resistance offered by disks 26 and 28 damps out or absorbs a substantial part of the increased speed or rotation and thus minimizes torsional vibration.

Although specific embodiments of the invention have been illustrated and described, it is not my intention to limit its scope thereby or otherwise than by the terms of the appended claims. While of great utility in connection with the crankshaft of an automobile, it is applicable to crankshafts generally, the term "crankshaft" being used as a convenient expression to indicate generically shafts arranged to be acted on intermittently, and in which torsional vibrations therefore tend to develope.

I claim:

1. A device of the class described comprising, in combination, a crankshaft, a friction member connected to the crankshaft, a cooperating friction member, and means to press said members together to create a frictional drag continuously acting on the crankshaft to thereby absorb or damp the torsional vibrations of the crankshaft.

2. A device of the class described comprising, in combination, a crankshaft, means to rotate said crankshaft in a manner tending to produce torsional vibrations therein, means to impart a thrust axially of the crankshaft, a relatively stationary friction member, and a friction member connected to the crankshaft and pressed against the stationary member by said thrust to damp or absorb the torsional vibrations.

3. A device of the class described comprising, in combination, a crankshaft, bearings therefor, a friction member carried by one of the bearings, a cooperating friction member carried by the crankshaft, and means to impart an end thrust to the crankshaft to press said members together to absorb or damp torsional vibrations in the crankshaft.

4. A device of the class described comprising, in combination, a rotating crankshaft having an end thrust, bearings therefor, a friction disk carried by one of the bearings, and a cooperating friction disk carried by the crankshaft and pressed against the first disk by the end thrust to absorb or damp torsional vibrations in the crankshaft.

5. A device of the class described comprising, in combination, a crankshaft, bearings therefor, cooperating frictionally engaging damping members carried respectively by the crankshaft and one of the bearings, a cam shaft, and helical gears connecting said shafts arranged to impart an end thrust to the crankshaft in a direction to press said members together.

6. A device of the class described comprising, in combination, a crankshaft, and tending to move it in the direction of its length, a stationary friction element, and a second friction element carried by said crankshaft and which moves in frictional engagement with said first mentioned friction element.

7. A device of the class described comprising, in combination, a crankshaft, bearings therefor, cooperating frictionally engaging damping members carried respectively by the crankshaft and one of the bearings and springs arranged to push the crankshaft axially to press said members together.

In testimony whereof I affix my signature.

ALEX TAUB.